Patented Aug. 7, 1923.

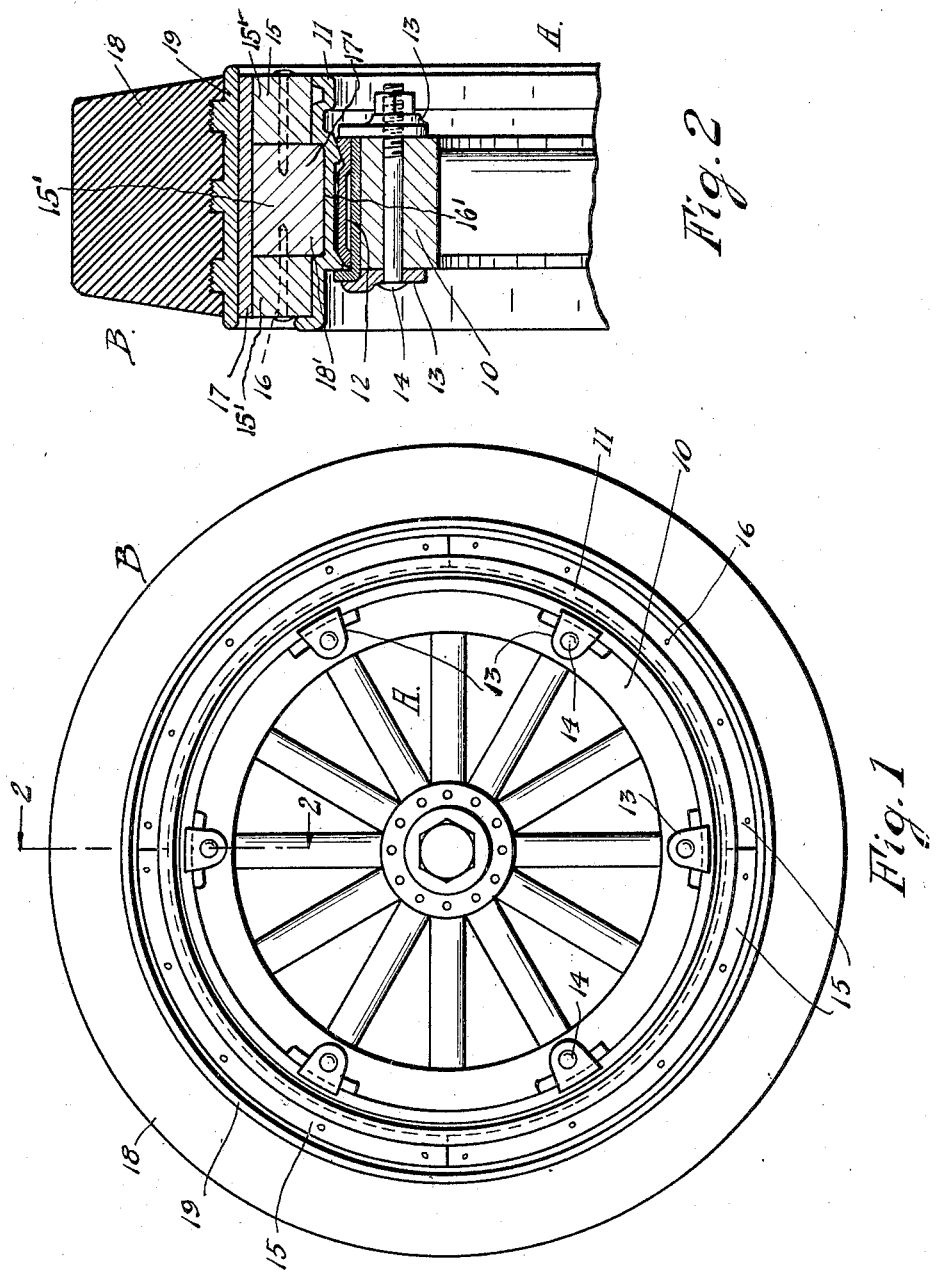

1,463,914

UNITED STATES PATENT OFFICE.

JOSEPH TOREN, OF CHICAGO, ILLINOIS.

PERMANENT SUBSTITUTE TIRE.

Application filed August 11, 1922. Serial No. 581,093.

*To all whom it may concern:*

Be it known that I, JOSEPH TOREN, a citizen of the United States, and a resident of the city of Chicago, county of Cook, and State of Illinois, have invented certain new and useful Improvements in Permanent Substitute Tires, of which the following is a specification.

My invention relates to improvements in permanent substitute tires and has for its principal object the provision of an improved construction of this character which will be highly efficient in use and economical in manufacture.

The primary object of the invention is the provision of utilizing the pneumatic tire wheel to construct a solid rubber tire wheel adapted for use in connection with motor trucks, touring cars, and vehicles of any description or design.

In attaining this object I build a filler member around the outer periphery of the demountable rim of a vehicle wheel and press a tire tread, consisting of a solid rubber tire and a rim carrying the tire, on the filler member thus constructed.

It is well known, by those skilled in the art, that to substitute solid tire wheels for pneumatic tire wheels is an expensive proposition, but by the construction of my improved wheel it will be readily seen that the cost of substituting will be reduced and that my improved wheel will be of great commerical value in the automobile art.

Other objects will appear hereinafter.

The invention consists in the combinations and arrangements of parts hereinafter described and claimed.

The invention will be best understood by reference to the accompanying drawings forming a part of this specification, and in which, Fig. 1 is a side elevational view of a vehicle wheel, embodying the invention; and Fig. 2 is a fragmentary sectional detail view of the same, taken substantially on line 2—2 of Fig. 1.

In attaining the objects alluded to and in carrying the invention into effect, I employ the ordinary demountable rim vehicle wheel A which consists of a felloe 10, a demountable rim 11 which when mounted on the felloe 10 is held in the position illustrated by a locking wedge 12, locking clamps 13 and lock bolts 14. It will be found that most every approved type of vehicle wheel of this character consists of the parts enumerated but it is to be understood that a slight variation of the parts designated will not interfere with the results which I obtain.

Around the periphery of the demountable rim 11, I build a filler member 15, consisting of sectional parts, each section being made up of longitudinal sections as indicated at 15' formed of suitable material, to facilitate mounting the filler member 15 on the periphery of the demountable rim 11, said parts being fixed together by suitable means, which in this case I designate at 16. One type of the ordinary demountable rim, as indicated at 11 in the drawing, has a circumferentially depressed portion indicated at 16' for obvious reasons well known in the art and in mounting the sectional parts of the filler member 15 about the rim the longitudinal section 17' of each sectional part has a portion indicated at 18' which fits snugly within this depressed portion and while serving to fill the depressed portion the portion 18' also serves to hold the sectional parts of the filler members against lateral movement as will be readily understood. Surrounding the filler member 15 is a metal rim 17 which is pressed tightly thereon and which serves to provide a smooth outer periphery and to hold the sectional parts of the filler member into tight engagement with the adjacent peripheral surface of the demountable rim. The solid tire tread B consists of a tire tread of the ordinary construction or of any approved construction which comprises a tread 18 and tire tread plate 19 which is ordinarily formed of metal. The tire is pressed on the rim 17 by a method well known in the art.

By referring to the drawings and by referring to the construction herein set forth, the method of mounting the tire B and filler member 15 on the demountable rim 11 will be readily understood and it will be seen that the cost of constructing the solid tire wheel out of a pneumatic tire wheel is greatly reduced over the cost for substituting a solid tire wheel for a pneumatic tire wheel.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. In a wheel structure, the combination with the felloe and demountable rim of a vehicle wheel and a circumferentially depressed portion formed in the rim, of a member mounted circumferentially with respect to the rim and having portions snugly fitting the depressed portion thereof, a band circumferentially surrounding the member, and a tire carrying plate pressed on the band.

2. In a wheel structure, the combination with the felloe and the demountable rim of a vehicle wheel having a circumferentially depressed portion formed in the rim, of a member comprising sectional parts mounted circumferentially with respect to the rim and having portions snugly fitting within the depressed portion, and a solid rubber tire carrying plate circumferentially surrounding the member.

In testimony whereof I have signed my name to this specification in the presence of the subscribing witnesses.

JOSEPH TOREN.

Witnesses:
 FREDA C. APPLETON,
 HELEN BRANDON,
 JOSHUA R. H. POTTS.